United States Patent
Lee et al.

(10) Patent No.: US 9,237,466 B2
(45) Date of Patent: Jan. 12, 2016

(54) METHOD AND APPARATUS FOR TRANSMITTING RADIO LINK FAILURE INFORMATION IN WIRELESS COMMUNICATION SYSTEM

(71) Applicant: LG Electronics Inc., Seoul (KR)

(72) Inventors: Young Dae Lee, Anyang-si (KR); Jae Wook Lee, Anyang-si (KR); Sung Hoon Jung, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/362,859

(22) PCT Filed: Jan. 31, 2013

(86) PCT No.: PCT/KR2013/000779
§ 371 (c)(1),
(2) Date: Jun. 4, 2014

(87) PCT Pub. No.: WO2013/115573
PCT Pub. Date: Aug. 8, 2013

(65) Prior Publication Data
US 2014/0335855 A1 Nov. 13, 2014

Related U.S. Application Data

(60) Provisional application No. 61/593,321, filed on Feb. 1, 2012.

(51) Int. Cl.
| | |
|---|---|
| H04M 1/00 | (2006.01) |
| H04W 24/04 | (2009.01) |
| H04W 24/10 | (2009.01) |
| H04W 36/00 | (2009.01) |
| H04W 76/02 | (2009.01) |
| H04W 88/06 | (2009.01) |

(52) U.S. Cl.
CPC .............. *H04W 24/04* (2013.01); *H04W 24/10* (2013.01); *H04W 36/0094* (2013.01); *H04W 76/028* (2013.01); *H04W 88/06* (2013.01)

(58) Field of Classification Search
CPC ... H04W 24/10; H04W 88/06; H04W 76/027; H04W 36/00; H04W 36/0005; H04W 36/08; H04W 36/24; H04W 36/30; H04W 24/04; H04W 36/094; H04W 76/028
USPC .......... 455/423, 436, 437, 438, 442, 445, 501
See application file for complete search history.

(56) References Cited

U.S. PATENT DOCUMENTS

| | | | |
|---|---|---|---|
| 2011/0077010 | A1 | 3/2011 | Xu et al. |
| 2011/0124340 | A1 | 5/2011 | Puttonen et al. |

(Continued)

FOREIGN PATENT DOCUMENTS

| | | |
|---|---|---|
| EP | 2403198 | 1/2012 |

*Primary Examiner* — Jean Gelin
(74) *Attorney, Agent, or Firm* — Dentons US LLP

(57) ABSTRACT

A method and apparatus of transmitting radio link failure (RLF) information in a wireless communication system is provided. A user equipment (UE) supports a first communication system and a second communication system. The method includes detecting an RLF at a first cell of the first communication system, and reporting an RLF report message to an eNodeB (eNB) serving the first cell based on whether or not the RLF is triggered by interference from the second communication system. In addition, a method and apparatus of restricting storing and/or reporting the RLF information in a wireless communication system is provided.

12 Claims, 12 Drawing Sheets

(56) References Cited

U.S. PATENT DOCUMENTS

2011/0242969 A1 10/2011 Dayal et al.
2011/0244804 A1 10/2011 Wu
2012/0020231 A1 1/2012 Chen
2012/0276897 A1* 11/2012 Kwon et al. .................. 455/423
2014/0328162 A1* 11/2014 Jeong et al. .................. 370/221

* cited by examiner

METHOD AND APPARATUS FOR TRANSMITTING RADIO LINK FAILURE INFORMATION IN WIRELESS COMMUNICATION SYSTEM

This application is a 35 USC §371 National Stage entry of International Application No. PCT/KR2013/000779 filed on Jan. 31, 2013, and claims priority to U.S. Provisional Application No. 61/593,321 filed on Feb. 1, 2012, all of which are hereby incorporated by reference in their entireties as if fully set forth herein.

BACKGROUND OF THE INVENTION

1. Field of the Invention

The present invention relates to wireless communication, and more particularly, to a method and apparatus for transmitting radio link failure (RLF) information in a wireless communication system.

2. Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Meanwhile, due to an in-device industrial, scientific and medical (ISM) transmitter, a 3GPP LTE radio can be interfered in case that the 3GPP LTE radio and an ISM radio coexist within the same device operating in adjacent frequencies. For example, when the LTE radio is working on band 40 and the ISM radio such as WLAN is active in a same device at the same time, the LTE radio in Rx mode is interfered by the ISM transmitter. Also, the transmission of the LTE radio can interfere the reception of the ISM/GNSS (global navigation satellite system) radio.

As a remedy for avoiding above in-device coexistence (IDC) interference, three possible LTE network-controlled user equipment (UE)-assisted solutions are suggested and captured in 3GPP TR 36.816, which are FDM, TDM, power control (PC) solution. From the LTE point of view, the FDM solution is to move the interfered LTE to another serving frequency. The TDM solution is to ensure that transmission of a radio signal does not coincide with reception of another radio signal. The PC solution is to reduce the LTE transmission power to mitigate the interference to ISM/GNSS receiver.

Depending on the solution, the necessary information included in the indication is different. For the FDM solution, the UE may indicate which frequencies are unusable due to in-device coexistence. For the TDM solutions, the UE may signal the necessary information, e.g. interferer type, mode, and possibly the appropriate offset in subframes to the eNB. The UE may also signal a suggested pattern to the eNB. For the PC solution, the UE may notify the network of interference type, power reduction value, etc.

Meanwhile, a radio link failure (RLF) may be occurred based on various reasons. The RLF may be occurred due to a radio resource control (RRC) connection reestablishment failure. In this case, RLF information is stored and is transmitted to the network. Or, the RLF may be occurred due to in-device coexistence (IDC) interference when the 3GPP LTE radio and an ISM radio coexist within the same device operating in adjacent frequencies. There is need to distinguish whether the RLF is triggered by interference from in-device ISM radio or not.

A method for restricting of storing and reporting RLF information based on in-device coexistence interference.

SUMMARY OF THE INVENTION

The present invention provides a method and apparatus for transmitting radio link failure (RLF) information in a wireless communication system. The present invention provides a method for restricting of storing and reporting RLF information based on in-device coexistence interference.

In an aspect, a method of transmitting, by a user equipment (UE), radio link failure (RLF) information in a wireless communication system is provided. The UE supports a first communication system and a second communication system. The method includes measuring at a first cell of the first communication system, detecting an RLF at the first cell of the first communication system, and reporting an RLF report message to an eNodeB (eNB) serving the first cell based on whether or not the RLF is triggered by interference from the second communication system.

In another aspect, a user equipment (UE) in a wireless communication system is provided. The UE supports a first communication system and a second communication system. The UE includes a first module for transmitting or receiving a radio signal for the first communication system, a second module for transmitting or receiving a radio signal for the second communication system, and a processor, operatively coupled to the first module and the second module, and configured for measuring at a first cell of the first communication system, detecting an RLF at the first cell of the first communication system, and reporting an RLF report message to an eNodeB (eNB) serving the first cell based on whether or not the RLF is triggered by interference from the second communication system.

Storing and reporting RLF information is restricted when an RLF is detected due to interference from coexistent in-device ISM radio.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
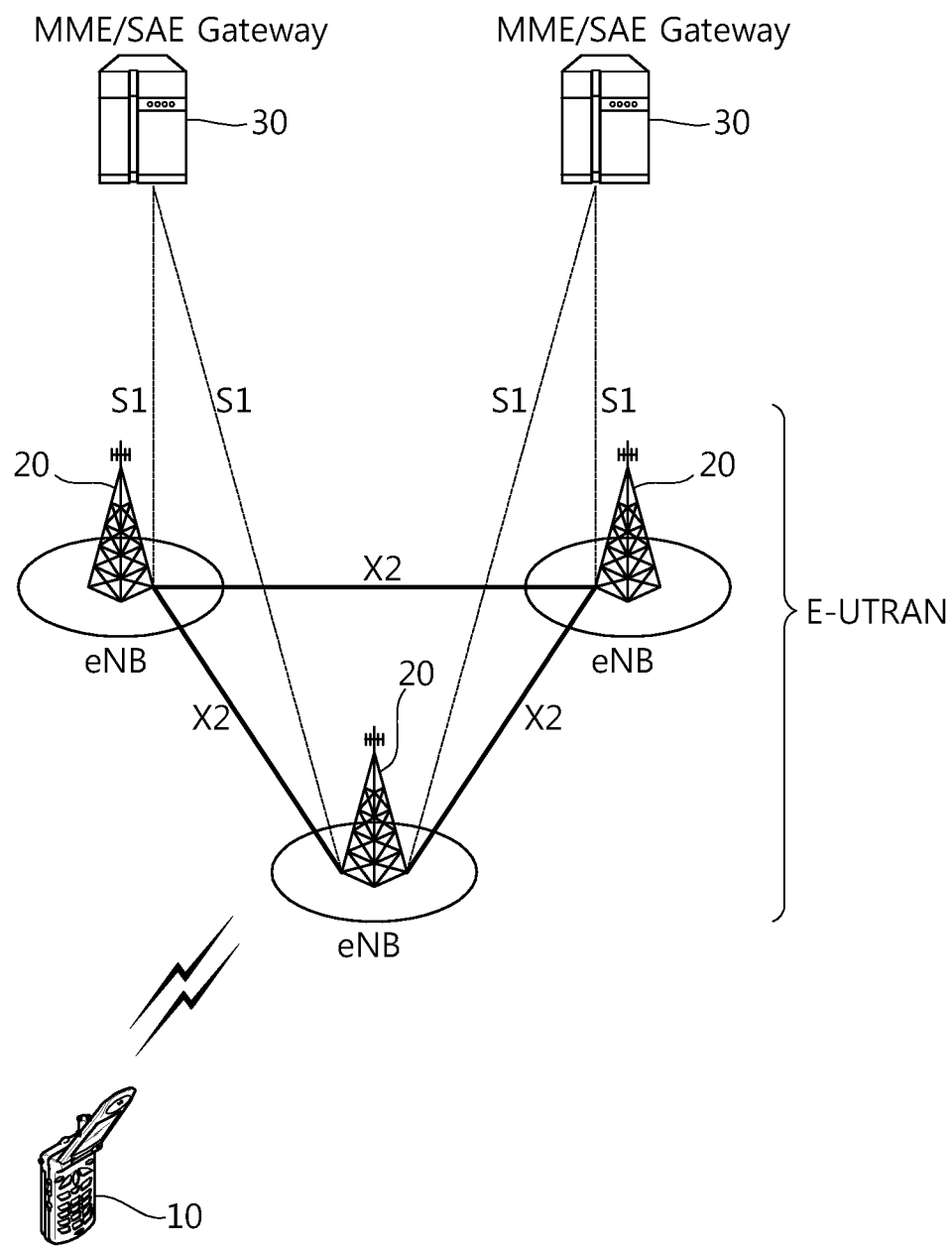
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
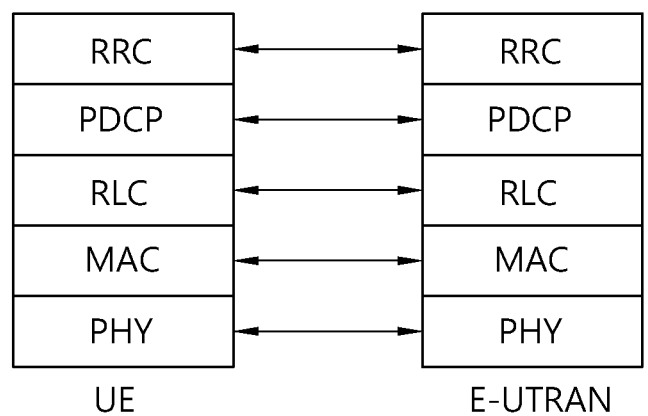
FIG. 2 is a diagram showing a radio interface protocol architecture for a control plane.
Figure 3:
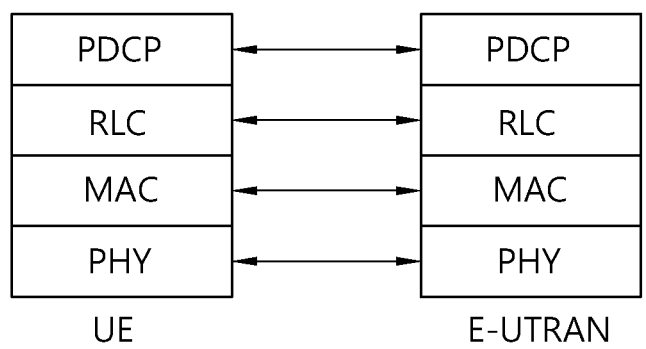
FIG. 3 is a diagram showing a radio interface protocol architecture for a user plane.

FIG. 2 is a diagram showing a radio interface protocol architecture for a control plane. FIG. 3 is a diagram showing a radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
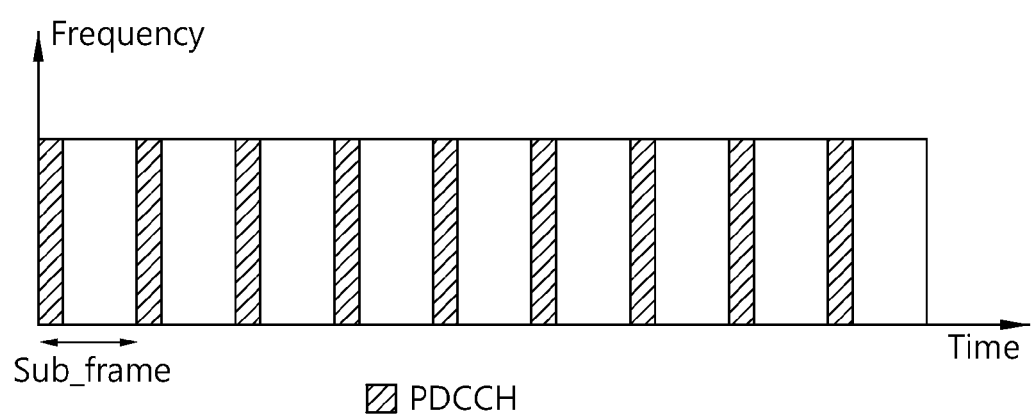
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

An RRC state indicates whether the RRC of the UE is logically connected to the RRC of the E-UTRAN. When an RRC connection is established between an RRC layer of the UE and an RRC layer of the network, the UE is in an RRC connected state (RRC_CONNECTED), and otherwise the UE is in an RRC idle state (RRC_IDLE). Since the UE in the RRC_CONNECTED state has the RRC connection established with the E-UTRAN, the E-UTRAN can recognize the existence of the UE in the RRC_CONNECTED and can effectively control the UE. Meanwhile, the UE in the RRC_IDLE state cannot be recognized by the E-UTRAN, and a core network (CN) manages the UE in unit of a tracking area (TA) which is a larger area than a cell. That is, only the existence of the UE in the RRC_IDLE state is recognized in unit of a large area, and the UE must transition to the RRC_CONNECTED state to receive a typical mobile communication service such as voice or data communication.

When the user initially powers on the UE, the UE first searches for a proper cell and then remains in the RRC_IDLE state in the cell. When there is a need to establish an RRC connection, the UE which remains in the RRC_IDLE state may establish the RRC connection with the RRC of the E-UTRAN through an RRC connection procedure and then may transition to the RRC_CONNECTED state. The UE which remains in the RRC_IDLE state may need to establish the RRC connection with the E-UTRAN when uplink data transmission is necessary due to a user's call attempt or the like or when there is a need to transmit a response message upon receiving a paging message from the E-UTRAN.

A non-access stratum (NAS) layer belongs to an upper layer of the RRC layer and serves to perform session management, mobility management, or the like. To manage mobility of the UE in the NAS layer, two states, i.e., an EPS mobility management (EMM)-REGISTERED state and an EMM-DEREGISTERED state, can be defined. The two states are applicable to the UE and the MME. The UE is initially in the EMM-DEREGISTERED state. To access the network, the UE may perform a process of registering to the network through an initial attach procedure. If the initial attach procedure is successfully performed, the UE and the MME may be in the EMM-REGISTERED state.

In addition, to manage a signaling connection between the UE and the EPC, two states, i.e., an EPS connection management (ECM)-IDLE state and an ECM-CONNECTED state, can be defined. The two states are applicable to the UE and the MME. When the UE in the ECM-IDLE state establishes an RRC connection with the E-UTRAN, the UE may be in the ECM-CONNECTED state. When the MME in the ECM-IDLE state establishes an S1 connection with the E-UTRAN, the MME may be in the ECM-CONNECTED state. When the UE is in the ECM-IDLE state, the E-UTRAN does not have information on the context of the UE. Therefore, the UE in the ECM-IDLE state can perform a UE-based mobility related procedure such as cell selection or cell reselection without having to receive a command of the network. If a location of the UE in the ECM-IDLE state becomes different from a location known to the network, the UE may report the location of the UE to the network through a tracking area update procedure. On the other hand, the mobility of the UE in the ECM-CONNECTED state may be managed by the command of the network.

Figure 5:
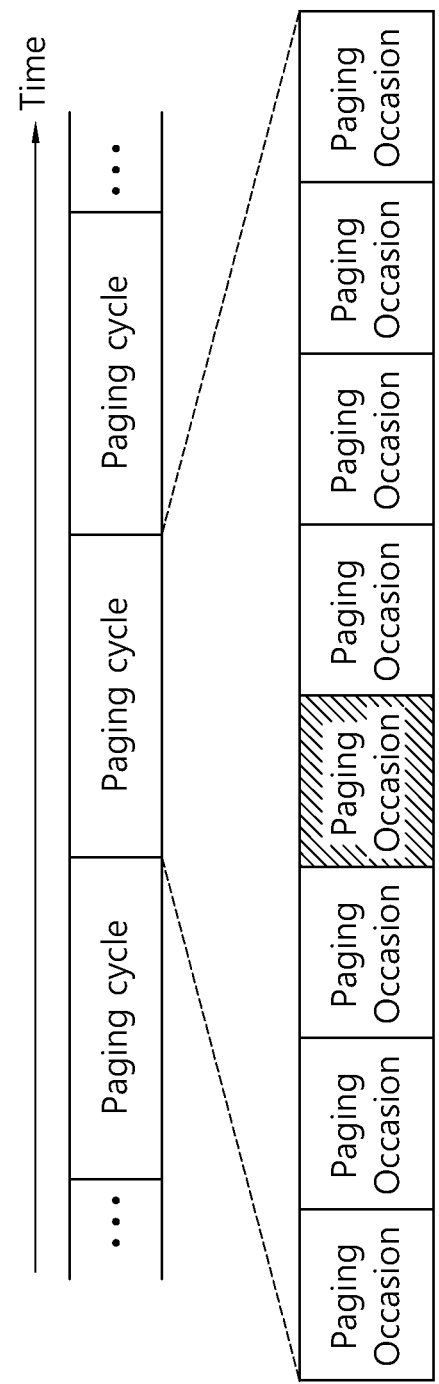
FIG. 5 shows transmission of a paging channel.

FIG. 5 shows transmission of a paging channel.

When there is data to be transmitted by a network to a specific UE or a call delivered to the specific UE, the paging message is used to search and wake up the UE. To transmit the paging message, an E-UTRAN may search for a certain location area in which the UE is currently located, and may transmit the paging message through one cell belonging to the location area in which the UE is located. For this, whenever there is a change in the location area, the UE may report the change to the network, which is called a location area update procedure.

Referring to FIG. 5, a plurality of paging cycles is configured, and one paging cycle may include a plurality of paging occasions. When receiving the paging message, the UE may perform discontinuous reception (DRX) to decrease power consumption. For this, the network may configure a plurality of paging occasions for every time period called a paging cycle, and a specific UE may receive the paging message by monitoring a paging channel only during a specific paging occasion. The UE does not monitor the paging channel in a time other than the specific paging occasion assigned to the UE. One paging occasion may correspond to one TTI.

The system information is necessary information which must be known to the UE to access the network. The UE must entirely receive the system information before the network access, and must always have the latest system information. In addition, since the system information is information which must be known to all UEs in one cell, the BS may periodically transmit the system information.

The system information may include a master information block (MIB), a scheduling block (SB), a system information block (SIB), etc. The MIB may indicate a physical configuration (e.g., a bandwidth, etc.) of a corresponding cell. The SB may indicate transmission information of SIBs, for example, a transmission period of the SIBs. The SIB is a set of related system information. For example, a certain SIB may include only information of a neighbor cell, and another SIB may include only information of an uplink radio channel used by the UE.

The BS may transmit the paging message to the UE to report whether there is a change in the system information. In this case, the paging message may include a system information change indicator. If the paging message received according to the paging cycle includes the system information change indicator, the UE may receive the system information transmitted through a BCCH which is a logical channel.

Referring to the section 5.2.1.2 of 3GPP TS 37.320 V10.0.0 (December 2010), if the UE which is RRC-connected with a serving cell detects a radio link failure (RLF) or a handover failure during an RRC connection reestablishment procedure and thus transitions to the RRC_IDLE state, the UE may store information related to the failure, that is, RLF information. The RLF information may include a channel measurement value of a last serving cell and a channel measurement value of a neighbor cell, information of a cell in which the RLF occurs, information of a location at which the RLF occurs, whether a failure is the RLF or the handover failure, an identifier (ID) of a cell which attempts RRC connection reestablishment, an ID of a cell to which the UE is lastly successfully connected before the RLF, etc. The channel measurement value of the cell may be reference signal received power (RSRP), reference signal received quality (RSRQ), etc. In addition, if specific location information such as global navigation satellite system (GNSS) location information or the like is available, the information of the location at which the RLF occurs may include a latitude, a longitude (mandatory), an altitude (conditional on availability), a velocity (conditional on availability), a direction (conditional on availability), etc.

If the UE stores the RLF information, the UE may report availability of the RLF information to the BS through an RRC connection reestablishment message during the RRC connection reestablishment procedure. Alternatively, the UE may report the availability of the RLF information to the BS through an RRC connection reconfiguration message during an RRC connection reconfiguration procedure. In addition, if the RRC connection reconfiguration procedure fails, the UE enters the RRC_IDLE state, and thereafter the UE may transition again to the RRC_CONNECTED state by performing the RRC connection establishment procedure according to an instruction of an NAS layer. In this case, the UE may report the availability of the RLF information to the BS through an RRC connection establishment complete message during the RRC connection establishment procedure.

The availability of the RLF information may be an rlf-InfoAvailable indicator defined in 3GPP TS 36.331 V10.0.0 (December 2010). If the RLF occurs in 3GPP LTE, the rlf-InfoAvailable indicator may be configured only in one LTE connection establishment message transmitted after the RLF.

When the UE reports the availability of the RLF information to the BS, the BS may request the RLF information by transmitting a UE information request message to the UE. Upon receiving the UE information request message, the UE may report the RLF information (i.e., rlf-Report) by using a UE information response message.

Figure 6:
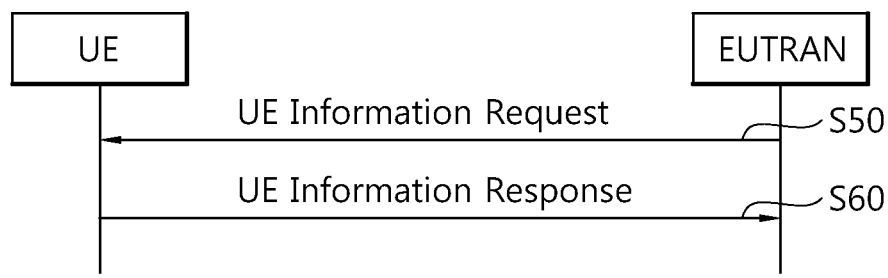
FIG. 6 shows an example of a UE information procedure that carries RLF information.

FIG. 6 shows an example of a UE information procedure that carries RLF information. It may refer to section 5.6.5.3 of 3GPP TS 36.331 V10.0.0 (December 2010).

The UE information procedure is used by the E-UTRAN to request the UE to report information. At step S50, the E-UTRAN transmits a UE information request message to the UE. At step S60, the UE transmits a UE information response message to the E-UTRAN.

Upon receiving the UE information request message, the UE shall:

1> if rach-ReportReq is set to true, set the contents of the rach-Report in the UE information response message as follows:

2> set the numberOfPreamblesSent to indicate the number of preambles sent by MAC for the last successfully completed random access procedure 2> if contention is detected by MAC for at least one of the transmitted preambles for the last successfully completed random access procedure:

3> set the contentionDetected to true;

2> else:

3> set the contentionDetected to false;

1> if rlf-ReportReq is set to true and there is radio link failure information available, set the contents of the rlf-Report in the UE information response message as follows:

2> set the measResultLastServCell;

2> set the measResultNeighCells to include best neighbouring cells, ordered such that the best cell is listed first, and based on measurements collected up to the moment the UE detected radio link failure;

3> if the UE was configured to perform measurements for one or more EUTRA frequencies, include the measResultListEUTRA and include the corresponding carrierFreq and measResultList;

3> if the UE was configured to perform measurement reporting for one or more neighbouring UTRA frequencies, include the measResultListUTRA and include the corresponding carrierFreq and measResultList;

3> if the UE was configured to perform measurement reporting for one or more neighbouring GERAN frequencies, include the measResultListGERAN;

3> if the UE was configured to perform measurement reporting for one or more neighbouring CDMA2000 frequencies, include the measResultsCDMA2000 and include the corresponding carrierFreq and measResultList;

1> if the logMeasReportReq is present and the plmn-Identity stored in VarLogMeasReport is equal to the RPLMN:
  2> if VarLogMeasReport includes one or more logged measurement entries, set the contents of the logMeasReport in the UE information response message as follows:
    3> include the absoluteTimeStamp and set it to the value of absoluteTimeInfo in the VarLogMeasConfig;
    3> include the mdt-MeasurementInfoList and set it to include one or more entries from VarLogMeasReport starting from the entries logged first;
  3> if the VarLogMeasReport is not empty:
    4> include the logMeasReportAvailable and set it to true;
1> if the logMeasReport is included in the UE information response message:
  2> submit the UE information response message to lower layers for transmission via SRB2;
  2> discard the logged measurement entries included in the mdt-MeasurementInfoList from VarLogMeasReport upon successful transmission of the UE information response message;
1> else:
  2> submit the UE information response message to lower layers for transmission via SRB1;

One thing to consider is that some UEs communicating with a serving cell in the 3GPP LTE may use in-device industrial, scientific and medical (ISM) transmitter/receiver such as Wi-Fi or Bluetooth. Thus, such UEs may detect the RLF on the serving cell in the 3GPP LTE due to interference from coexistent in-device ISM radio. But, other UEs may detect RLF due to not interference from the in-device ISM radio, but interference that internally occurs in the 3GPP LTE. Thus, when several UEs transmit RLF information to the E-UTRAN, the E-UTRAN cannot identify whether specific RLF is triggered by interference from in-device ISM radio or not.

To help the E-UTRAN identify whether each RLF is triggered by interference from in-device ISM radio or not, the present invention comprises maintaining a connection with a cell of a first communication system, identifying communication with a second communication system, receiving a signal at the cell, detecting an RLF at the cell, and then transmitting a message indicating the second communication system to the network. It is assumed that the UE has both an LTE module and an ISM module such Wi-Fi module (e.g. transmitter and receiver). It is also assumed that the UE is connected to one serving E-UTRAN cell.

Figure 7:
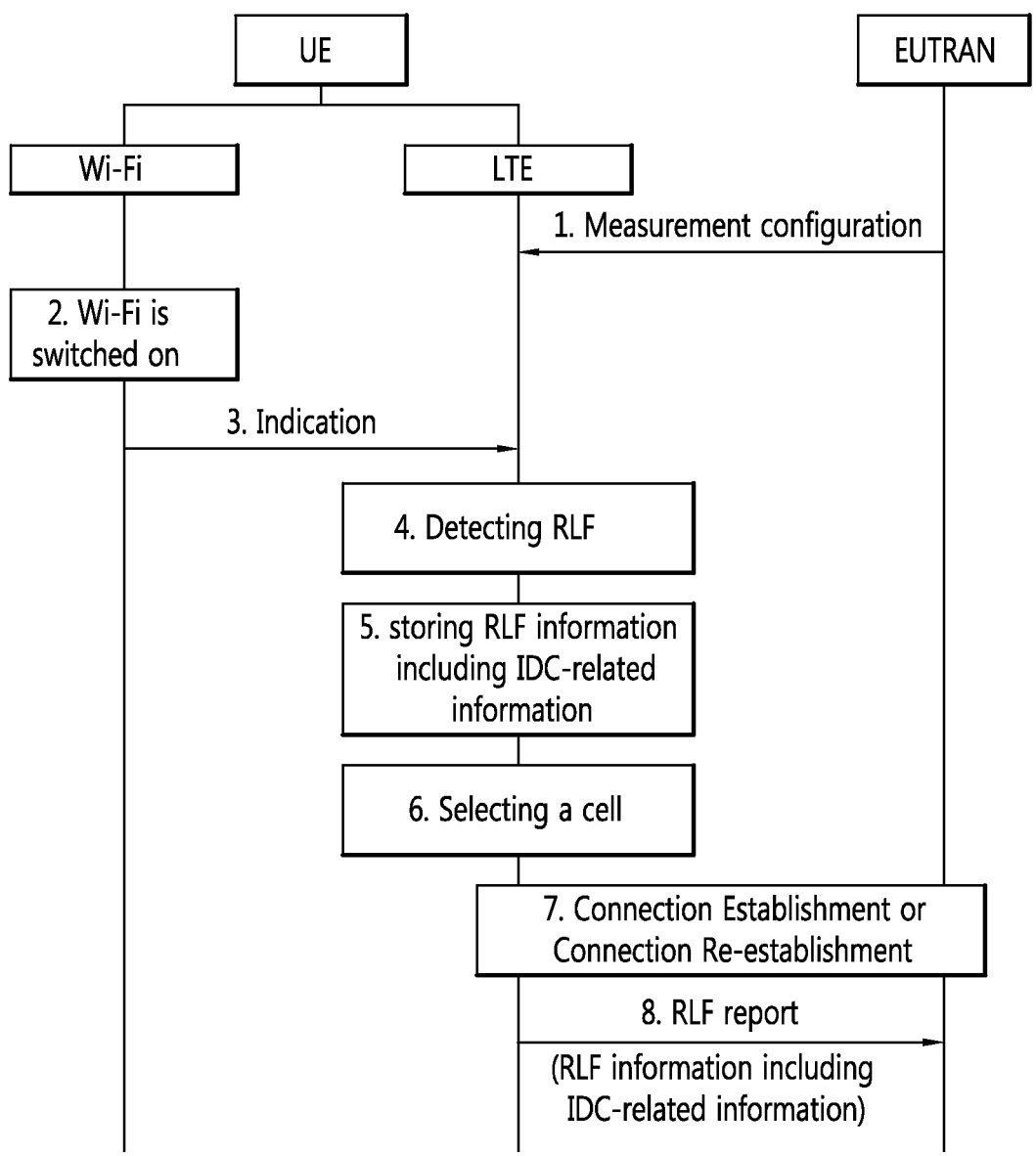
FIG. 7 shows an example of transmitting RLF information according to an embodiment of the present invention.

FIG. 7 shows an example of transmitting RLF information according to an embodiment of the present invention.

1. One eNB controlling the serving E-UTRAN cell in the E-UTRAN transmits a measurement configuration message to the UE. Upon receiving the measurement configuration message, the UE configures measurements and performs measurement based on the measurement configuration message.

2. While the UE is connected to the E-UTRAN, the UE turns on a Wi-Fi module. The Wi-Fi module may start to communicate with a Wi-Fi access point (AP).

3. The Wi-Fi module informs the LTE module of the UE of turn-on of the Wi-Fi module.

4. The UE detects an RLF at the serving E-UTRAN cell.

5. Upon detection of the RLF, the UE stores RLF information such as cell identity of the serving E-UTRAN cell and measured cell quality of the last E-UTRAN cell. The RLF information may include measurement results that measured from either the last cell where the RLF occurs or the source cell initiating failed handover.

Also, the UE stores IDC-related information including the type of ISM module (i.e. Wi-Fi module) and a version/release of ISM technology such as Wi-Fi. The type of ISM module may be one of a Wi-Fi module, a Bluetooth module, a GNSS module, or a WiBro module. Either RLF information or IDC-related information may also include measurement results including interference that was received by the 3GPP LTE module and caused by the Wi-Fi module. Either RLF information or IDC-related information may also include an indicator indicating whether or not the Wi-Fi module of the UE was turned on at the time when the RLF occurs. Either RLF information or IDC-related information may also include an indicator indicating whether or not measurement relating to interference caused by the Wi-Fi module was configured on at the time when the RLF occurs.

6. The UE performs cell selection or cell reselection and then selects a new E-UTRASN serving cell which may be equal to the cell where RLF occurred.

7. The UE performs an RRC connection reestablishment procedure after cell selection, or performs an RRC connection establishment procedure after the UE is going to RRC_IDLE state. When one of the procedures is successfully completed, whichever procedure is successful, the UE is in RRC_CONNECTED state. The UE may indicate availability of RLF information and/or IDC-related information to the E-UTRAN during the RRC connection reestablishment procedure or the RRC connection establishment procedure.

8. The UE in RRC_CONNECTED transmits an RLF report to the E-UTRAN cell, e.g. upon reception of request from the E-UTRAN. The RLF report may include the RLF information including the IDC-related information.

The E-UTRAN may use the IDC-related information in the RLF report to filter out RLF reports that are received from several UEs. The E-UTRAN may discard one or more received RLF reports including the IDC-related information and then use only RLF reports not including the IDC-related information.

In addition, the E-UTRAN may use the RLF information including the IDC-related information to determine measurement configuration related to IDC. For instance, the E-UTRAN may use the RLF information including the IDC-related information to determine a measurement threshold that is used to trigger IDC-related report i.e. when IDC-related report is triggered.

In the embodiment of the present invention described above, upon detection of an RLF generated by an in-device ISM module, the UE stores the RLF information and the IDC-related information, and transmits the RLF information and the IDC-related information by including the information to the RLF report after the RRC connection reestablishment procedure or the RRC connection establishment procedure. However, according to another embodiment of the present invention, upon detection of the RLF generated by the in-device ISM module, the UE may not store the RLF information and the IDC-related information. Alternatively, according to another embodiment of the present invention, upon detection of the RLF generated by the in-device ISM module, the UE may store the RLF information and the IDC-related information and may not report the availability of the RLF information. Alternatively, according to another embodiment of the present invention, upon detection of the RLF generated by the in-device ISM module, the UE may store the RLF information and the IDC-related information and report the availability of the RLF information, and the BS may not request the UE information request. Alternatively, according to another embodiment of the present invention, upon detection of the RLF generated by the in-device ISM module, the UE may store the RLF information and the IDC-related information and report the availability of the RLF information, and may not transmit the RLF report to the BS. The embodiments described above show a method in which storing and/or reporting of the RLF information and/or the IDC-related information are restricted upon detection of the RLF generated by the in-device ISM module. This is because the RLF caused by the in-device ISM module is finally discarded in the BS.

Figure 8:
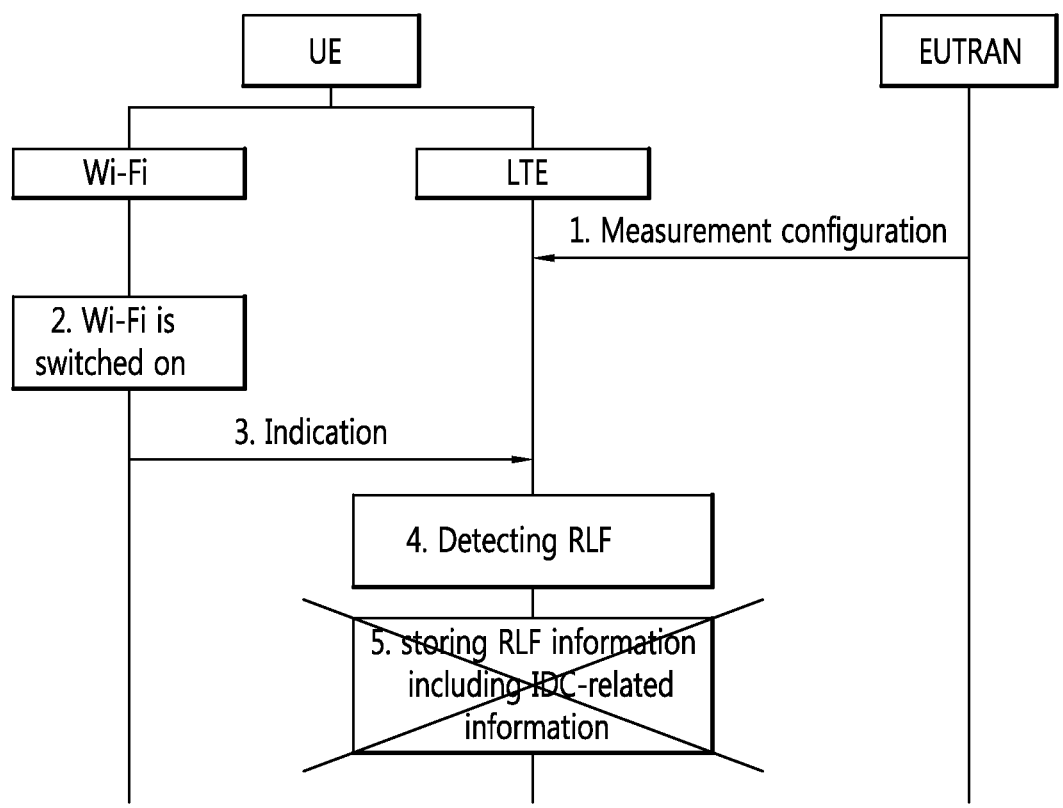
FIG. 8 shows an example of restricting storing RLF information according to an embodiment of the present invention.

FIG. 8 shows an example of restricting storing RLF information according to an embodiment of the present invention.

1. One eNB controlling the serving E-UTRAN cell in the E-UTRAN transmits a measurement configuration message to the UE. Upon receiving the measurement configuration message, the UE configures measurements and performs measurement based on the measurement configuration message.

2. While the UE is connected to the E-UTRAN, the UE turns on a Wi-Fi module. The Wi-Fi module may start to communicate with a Wi-Fi access point (AP).

3. The Wi-Fi module informs the LTE module of the UE of turn-on of the Wi-Fi module.

4. The UE detects an RLF at the serving E-UTRAN cell.

5. Upon detection of the RLF, the UE does not store RLF information such as cell identity of the serving E-UTRAN cell and measured cell quality of the last E-UTRAN cell. Also, the UE does not store IDC-related information including the type of ISM module (i.e. Wi-Fi module) and a version/release of ISM technology such as Wi-Fi. Accordingly, the UE cannot transmit the RLF information including the IDC-related information, and the E-UTRAN does not have to filter out the RLF reports from several UEs.

Figure 9:
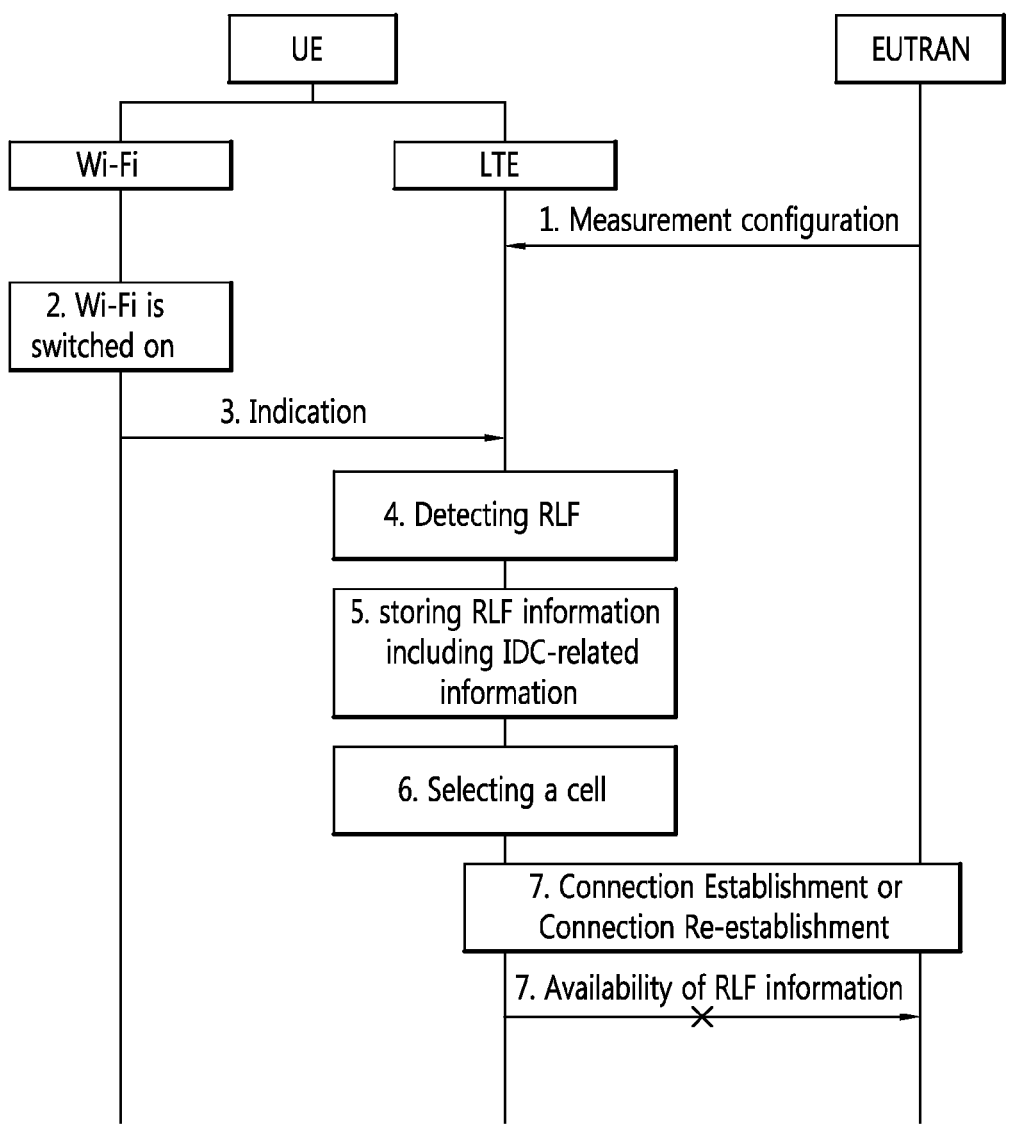
FIG. 9 shows an example of restricting reporting RLF information according to an embodiment of the present invention.

FIG. 9 shows an example of restricting reporting RLF information according to an embodiment of the present invention.

1. One eNB controlling the serving E-UTRAN cell in the E-UTRAN transmits a measurement configuration message to the UE. Upon receiving the measurement configuration message, the UE configures measurements and performs measurement based on the measurement configuration message.

2. While the UE is connected to the E-UTRAN, the UE turns on a Wi-Fi module. The Wi-Fi module may start to communicate with a Wi-Fi access point (AP).

3. The Wi-Fi module informs the LTE module of the UE of turn-on of the Wi-Fi module.

4. The UE detects an RLF at the serving E-UTRAN cell.

5. Upon detection of the RLF, the UE stores RLF information such as cell identity of the serving E-UTRAN cell and measured cell quality of the last E-UTRAN cell. Also, the UE stores IDC-related information including the type of ISM module (i.e. Wi-Fi module) and a version/release of ISM technology such as Wi-Fi. Either RLF information or IDC-related information may also include measurement results including interference that was received by the 3GPP LTE module and caused by the Wi-Fi module. Either RLF information or IDC-related information may also include an indicator indicating whether or not the Wi-Fi module of the UE was turned on at the time when the RLF occurs. Either RLF information or IDC-related information may also include an indicator indicating whether or not measurement relating to interference caused by the Wi-Fi module was configured on at the time when the RLF occurs.

6. The UE performs cell selection or cell reselection and then selects a new E-UTRASN serving cell which may be equal to the cell where RLF occurred.

7. The UE performs an RRC connection reestablishment procedure after cell selection, or performs an RRC connection establishment procedure after the UE is going to RRC_IDLE state. When one of the procedures is successfully completed, whichever procedure is successful, the UE is in RRC_CONNECTED state.

However, the UE does not transmit an indicator, e.g, rlf-InfoAvailable indicator defined in 3GPP TS 36.331 V10.0.0 (December 2010), indicating an availability of the RLF information. Therefore, the E-UTRAN cannot request the RLF information including the IDC-related information, and the E-UTRAN does not have to filter out the RLF reports from several UEs.

Figure 10:
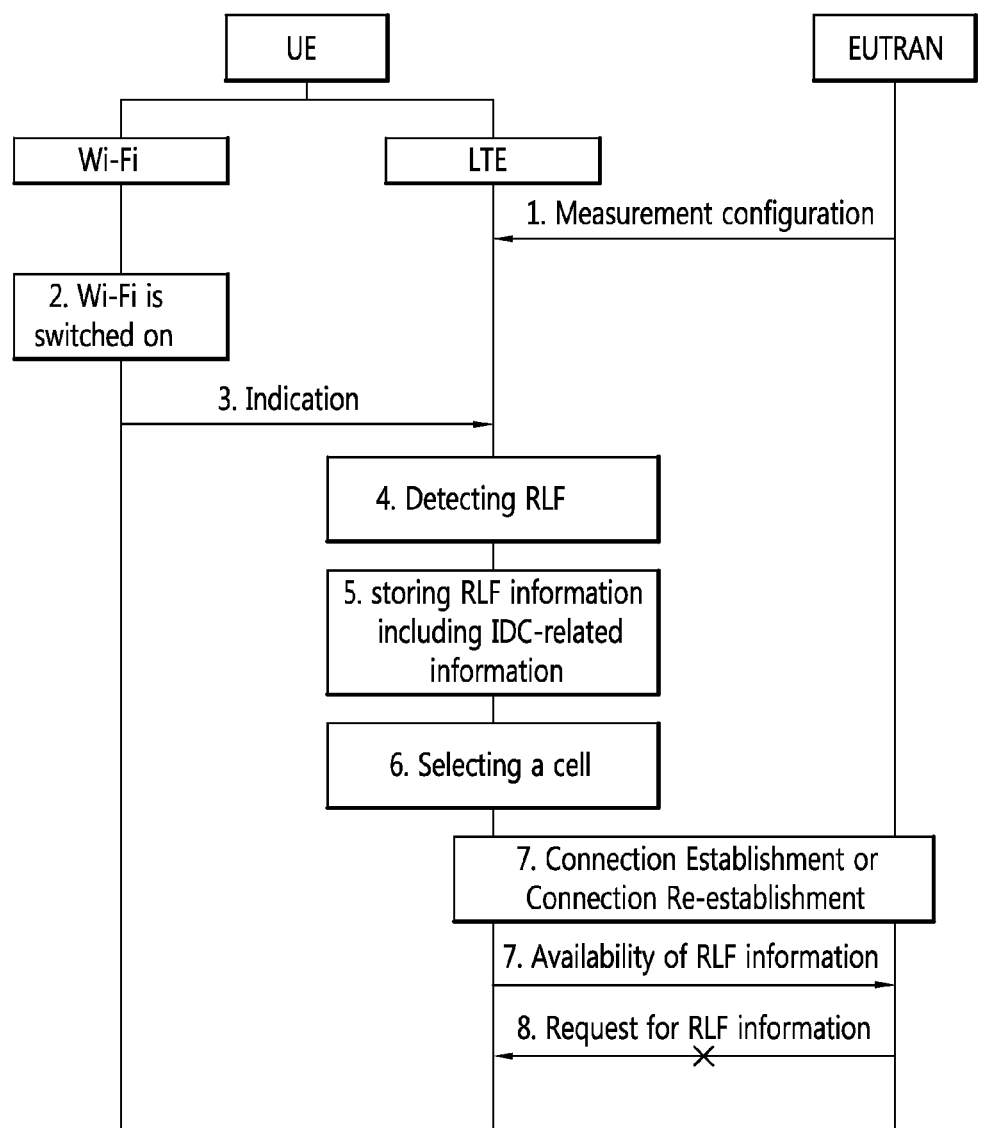
FIG. 10 shows another example of restricting reporting RLF information according to an embodiment of the present invention.

FIG. 10 shows another example of restricting reporting RLF information according to an embodiment of the present invention.

1. One eNB controlling the serving E-UTRAN cell in the E-UTRAN transmits a measurement configuration message to the UE. Upon receiving the measurement configuration message, the UE configures measurements and performs measurement based on the measurement configuration message.

2. While the UE is connected to the E-UTRAN, the UE turns on a Wi-Fi module. The Wi-Fi module may start to communicate with a Wi-Fi access point (AP).

3. The Wi-Fi module informs the LTE module of the UE of turn-on of the Wi-Fi module.

4. The UE detects an RLF at the serving E-UTRAN cell.

5. Upon detection of the RLF, the UE stores RLF information such as cell identity of the serving E-UTRAN cell and measured cell quality of the last E-UTRAN cell. Also, the UE stores IDC-related information including the type of ISM module (i.e. Wi-Fi module) and a version/release of ISM technology such as Wi-Fi. Either RLF information or IDC-related information may also include measurement results including interference that was received by the 3GPP LTE module and caused by the Wi-Fi module. Either RLF information or IDC-related information may also include an indicator indicating whether or not the Wi-Fi module of the UE was turned on at the time when the RLF occurs. Either RLF information or IDC-related information may also include an indicator indicating whether or not measurement relating to interference caused by the Wi-Fi module was configured on at the time when the RLF occurs.

6. The UE performs cell selection or cell reselection and then selects a new E-UTRASN serving cell which may be equal to the cell where RLF occurred.

7. The UE performs an RRC connection reestablishment procedure after cell selection, or performs an RRC connection establishment procedure after the UE is going to RRC_IDLE state. When one of the procedures is successfully completed, whichever procedure is successful, the UE is in RRC_CONNECTED state. The UE may indicate availability of RLF information and/or IDC-related information to the E-UTRAN during the RRC connection reestablishment procedure or the RRC connection establishment procedure.

8. However, the E-UTRAN does not request the RLF information including the IDC-related information to the UE in RRC_CONNECTED state. Therefore, the UE cannot transmit the RLF information including the IDC-related information, and the E-UTRAN does not have to filter out the RLF reports from several UEs.

Figure 11:
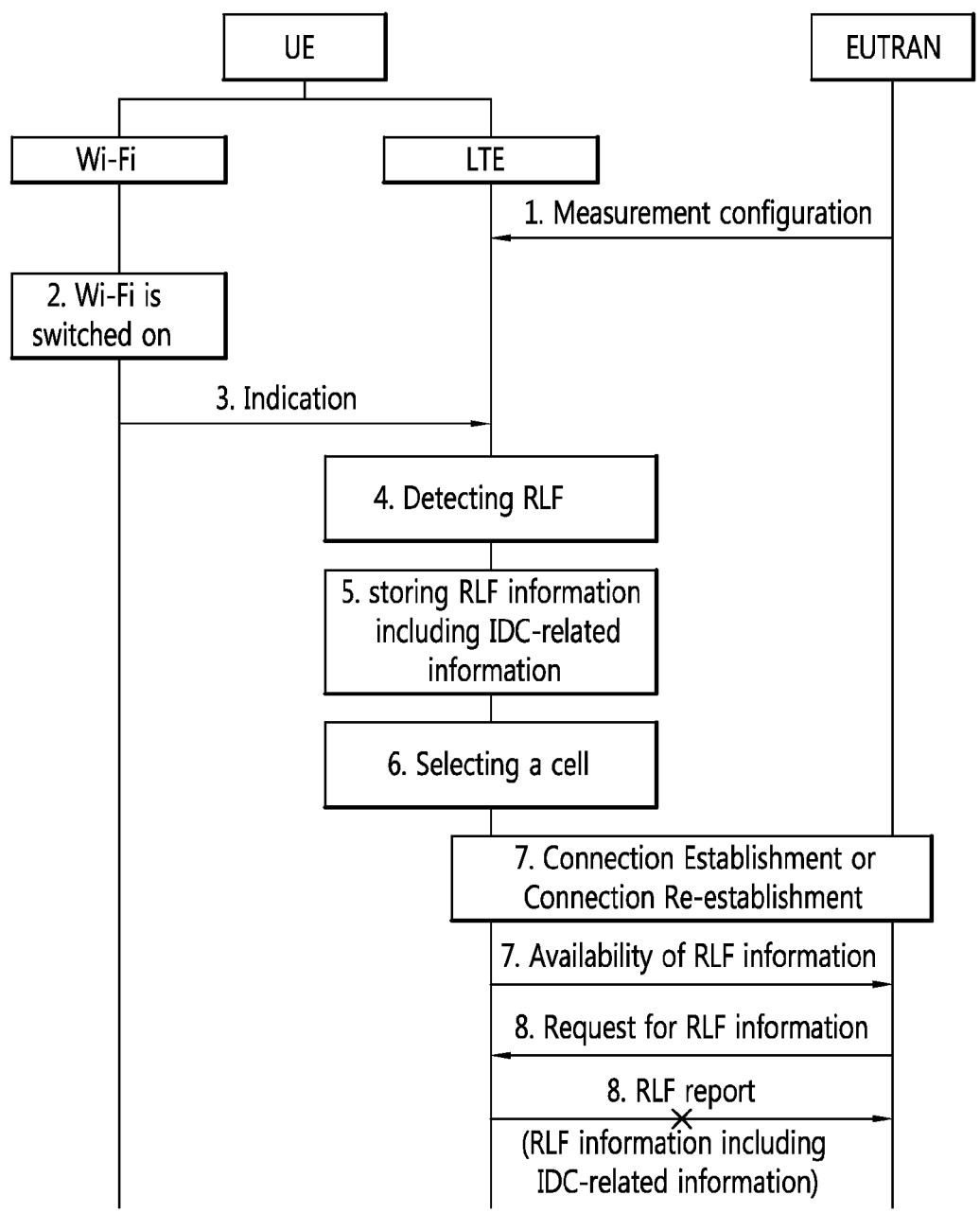
FIG. 11 shows another example of restricting reporting RLF information according to an embodiment of the present invention.

FIG. 11 shows another example of restricting reporting RLF information according to an embodiment of the present invention.

1. One eNB controlling the serving E-UTRAN cell in the E-UTRAN transmits a measurement configuration message to the UE. Upon receiving the measurement configuration message, the UE configures measurements and performs measurement based on the measurement configuration message.

2. While the UE is connected to the E-UTRAN, the UE turns on a Wi-Fi module. The Wi-Fi module may start to communicate with a Wi-Fi access point (AP).

3. The Wi-Fi module informs the LTE module of the UE of turn-on of the Wi-Fi module.

4. The UE detects an RLF at the serving E-UTRAN cell.

5. Upon detection of the RLF, the UE stores RLF information such as cell identity of the serving E-UTRAN cell and measured cell quality of the last E-UTRAN cell. Also, the UE stores IDC-related information including the type of ISM module (i.e. Wi-Fi module) and a version/release of ISM technology such as Wi-Fi. Either RLF information or IDC-related information may also include measurement results including interference that was received by the 3GPP LTE module and caused by the Wi-Fi module. Either RLF information or IDC-related information may also include an indicator indicating whether or not the Wi-Fi module of the UE was turned on at the time when the RLF occurs. Either RLF information or IDC-related information may also include an indicator indicating whether or not measurement relating to interference caused by the Wi-Fi module was configured on at the time when the RLF occurs.

6. The UE performs cell selection or cell reselection and then selects a new E-UTRASN serving cell which may be equal to the cell where RLF occurred.

7. The UE performs an RRC connection reestablishment procedure after cell selection, or performs an RRC connection establishment procedure after the UE is going to RRC_IDLE state. When one of the procedures is successfully completed, whichever procedure is successful, the UE is in RRC_CONNECTED state. The UE may indicate availability of RLF information and/or IDC-related information to the E-UTRAN during the RRC connection reestablishment procedure or the RRC connection establishment procedure.

8. However, the UE in RRC_CONNECTED state does not transmit the RLF report including the RLF information including the IDC-related information upon reception of request from the E-UTRAN. Accordingly, the E-UTRAN does not have to filter out the RLF reports from several UEs.

Figure 12:
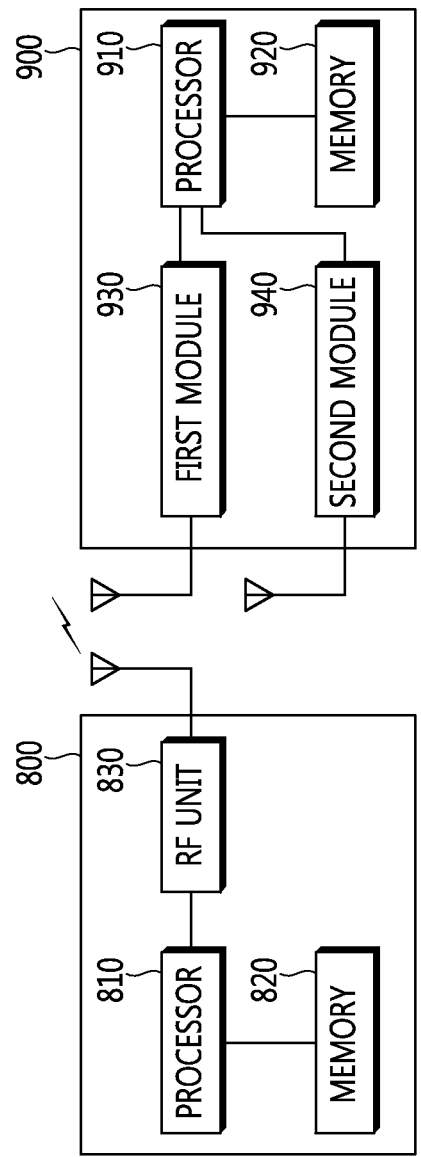
FIG. 12 is a block diagram showing wireless communication system to implement an embodiment of the present invention.

FIG. 12 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920, a first module 930, and a second module 940. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The first module 930 is operatively coupled with the processor 910, and transmits and/or receives a radio signal for a first communication system. The second module 930 is operatively coupled with the processor 910, and transmits and/or receives a radio signal for a second communication system.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF unit 830, the first module 930, and the second module 940 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method of transmitting, by a user equipment (UE), radio link failure (RLF) information in a wireless communication system, the UE supporting a first communication system and a second communication system, the method comprising:
   measuring at a first cell of the first communication system;
   receiving an indication that a module of the second communication system is turned-on from the module;
   detecting an RLF at the first cell of the first communication system;
   storing RLF information including at least one of a cell identity of the first cell and a measurement result from either a last cell where the RLF occurred or a source cell initiating failed handover; and
   reporting an RLF report message including RLF information to an eNodeB (eNB) serving the first cell based on whether the RLF is triggered by interference from the second communication system,
   wherein the RLF information further includes in-device coexistence (IDC)-related information,
   wherein the IDC-related information includes information related to whether the module of the second communication system was turned on at the time the RLF occurred, and
   wherein the IDC-related information further includes information related to whether a measurement relating to interference caused by the second communication system was configured on at the time the RLF occurred.

2. The method of claim 1, wherein the IDC-related information indicates measurement results including interference caused by the second communication system.

3. The method of claim 1, wherein the IDC-related information indicates a type or an identifier of the second communication system.

4. The method of claim 1, wherein the first system is an evolved-UMTS terrestrial radio access network (E-UTRAN) system.

5. The method of claim 4, wherein the E-UTRAN system filters out the RLF report message based on the IDC-related information, and
wherein the E-UTRAN system determines a measurement threshold used to trigger the IDC-related report based on the IDC-related information.

6. The method of claim 1, wherein the second communication system is one of a Wi-Fi system, a Bluetooth system, a global navigation satellite system, and a WiBro system.

7. The method of claim 1, further comprising:
maintaining a connection with the first cell of the first communication system;
identifying communication with the second communication system.

8. The method of claim 1, further comprising:
performing a radio resource control (RRC) connection establishment procedure or an RRC connection reestablishment procedure with a new serving cell; and
indicating availability of RLF information to an eNB serving the new serving cell.

9. The method of claim 8, further comprising receiving a request for the RLF information from the eNB serving the new serving cell.

10. A user equipment (UE), supporting a first communication system and a second communication system, in a wireless communication system, the UE, the UE comprising:
a first module for transmitting or receiving a radio signal for the first communication system;
a second module for transmitting or receiving a radio signal for the second communication system; and
a processor, operatively coupled to the first module and the second module, and configured for:
measuring at a first cell of the first communication system;
receiving an indication that a module of the second communication system is turned-on;
detecting an RLF at the first cell of the first communication system;
storing RLF information including at least one of a cell identity of the first cell and a measurement result from either a last cell where the RLF occurred or a source cell initiating failed handover; and
reporting an RLF report message including RLF information to an eNodeB (eNB) serving the first cell based on whether the RLF is triggered by interference from the second communication system,
wherein the RLF information further includes in-device coexistence (IDC)-related information,
wherein the IDC-related information includes information related to whether the module of the second communication system was turned on at the time the RLF occurred, and
wherein the IDC-related information further includes information related to whether a measurement relating to interference caused by the second communication system was configured on at the time the RLF occurred.

11. The UE of claim 10, wherein the first system is an evolved-UMTS terrestrial radio access network (E-UTRAN) system.

12. The UE of claim 11, wherein the E-UTRAN system filters out the RLF report message based on the IDC-related information, and
wherein the E-UTRAN system determines a measurement threshold used to trigger the IDC-related report based on the IDC-related information.

* * * * *